Patented Feb. 18, 1936

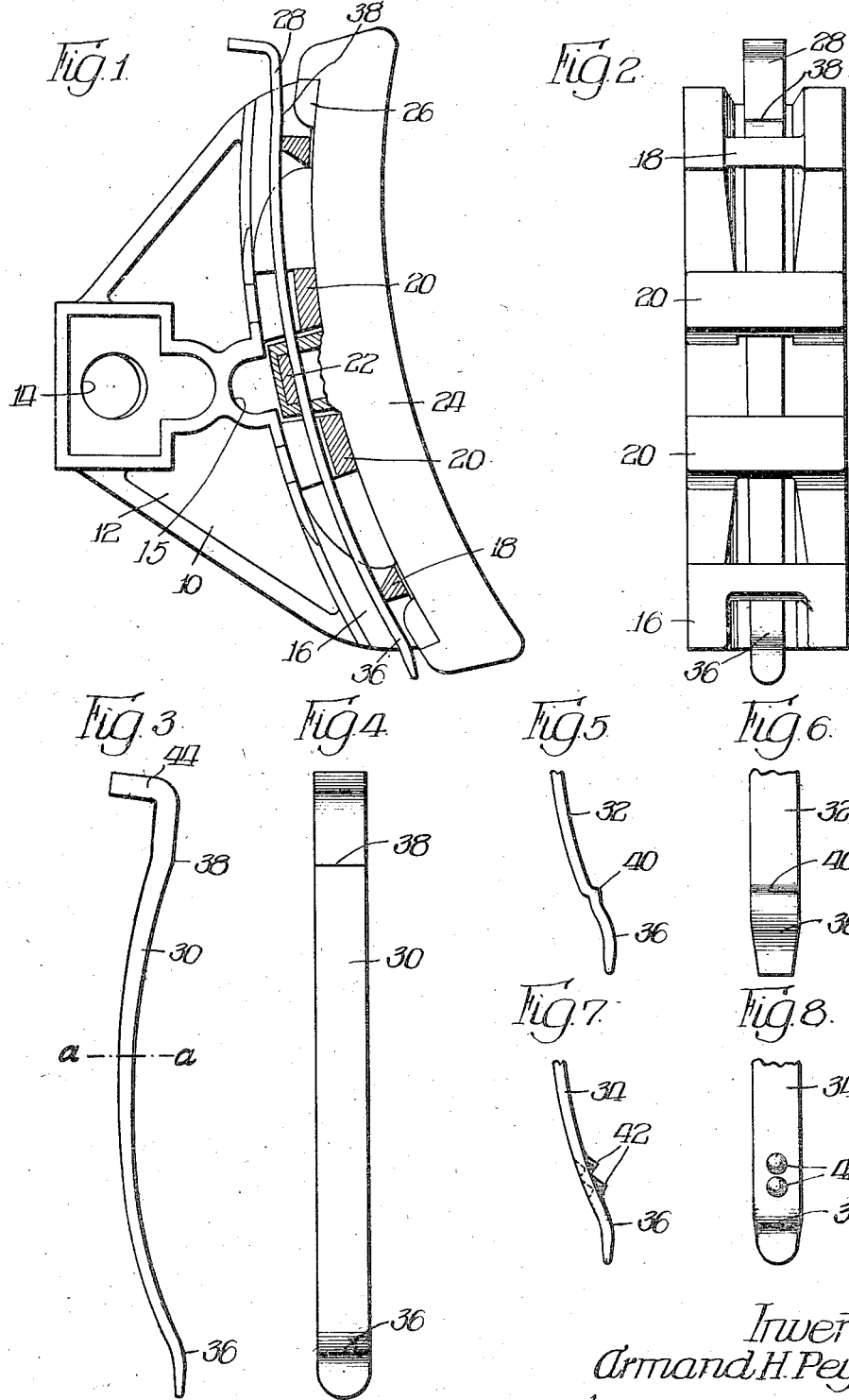
Feb. 18, 1936.  A. H. PEYCKE  2,031,127
BRAKE HEAD ARRANGEMENT
Filed Jan. 16, 1933  2 Sheets-Sheet 1
Inventor:
Armand H. Peycke

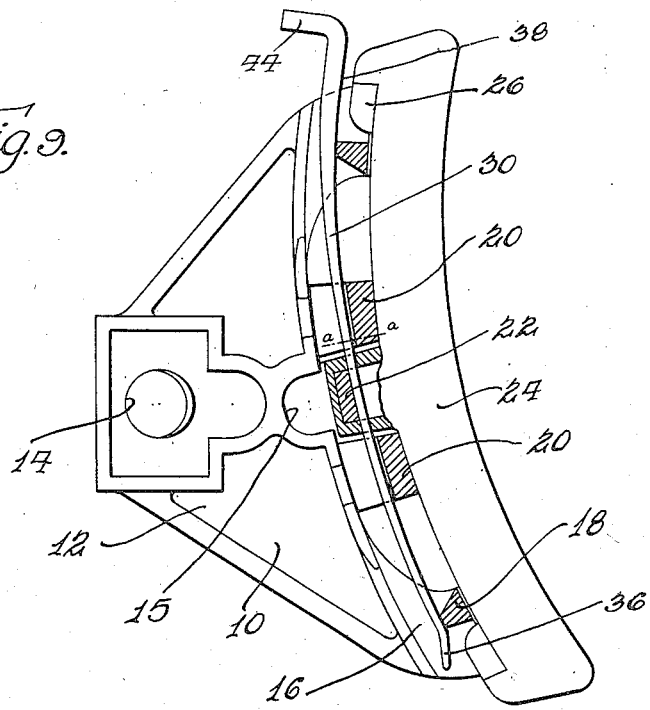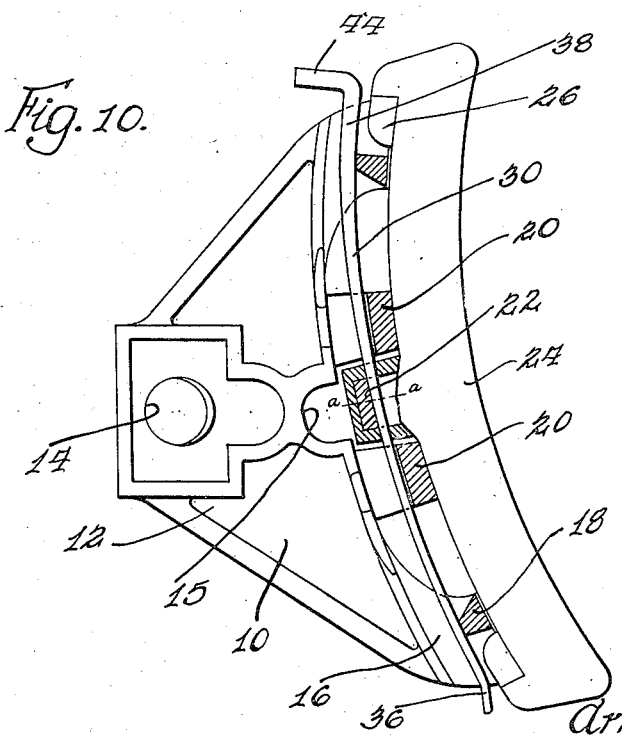

2,031,127

UNITED STATES PATENT OFFICE 2,031,127

BRAKE HEAD ARRANGEMENT

Armand H. Peycke, Kenilworth, Ill., assignor to American Steel Foundries, Chicago, Ill., a corporation of New Jersey Application January 16, 1933, Serial No. 651,882

21 Claims. (Cl. 188—243).

This invention pertains to a brake head and shoe arrangement.

In the present A. R. A. construction the brake head and shoe assembly consists essentially of a brake head having spaced toes and provided with spaced head or center lugs adapted to be disposed on either side of the brake shoe center lug, the toes and center lugs of the brake head contacting the brake shoe. The connection is made by a key which is normally not resilient but is a set wedge, and is disposed in contacting relation with the center lugs of both the shoe and head. In such constructions wear readily causes the shoe to become loose from the head.

It is therefore an object of this invention to provide a brake head arrangement comprising a brake head and shoe, and securing means therebetween which will maintain the shoe and head in tight assembly regardless of wear between the relative parts.

Another object is to provide a brake head arrangement wherein the securing key is adapted to be flexed between securing means on the head and shoe for providing a tight assembly.

A further object is to provide a brake head and shoe assembly wherein a flexible key is adapted to be inserted and driven to assembled position for providing a truss locking means between the head and shoe.

A yet further object is to provide a brake head and shoe arrangement wherein the locking means is effective over substantially the entire depth of the brake head.

With these and various other objects in view, the invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 1 is a side elevation partly in section of the brake head and shoe assembly embodying the invention;

Figure 2 is an end elevation of the brake head with the brake shoe removed, showing the application thereto of the flexible locking means;

Figure 3 is a side elevation of one form of locking key embodying the invention;

Figure 4 is a bottom plan view of the key shown in Figure 3;

Figure 5 is a fragmentary side elevation of another form of locking key;

Figure 6 is a bottom plan view of the key shown in Figure 5;

Figure 7 is a fragmentary side elevation of a modified form of locking key;

Figure 8 is a bottom plan view of the key shown in Figure 7;

Figure 9 is a side elevation partly in section corresponding to Figure 1 of the drawings, but showing the key of Figure 3 in its partly assembled relation with the brake head and shoe; and Figure 10 is a view similar to Figure 9 showing the key in its fully operative position with respect to the brake head and shoe.

Referring first of all more particularly to the brake shoe assembly shown in Figures 1 and 2, the brake head 10 is substantially of conventional construction, being provided with the body portion 12 having securing means in the form of the apertures 14 and 15 for application of the brake head to a brake beam and to a brake hanger. The head is provided adjacent the ends with the spaced toe portions 16 connected inwardly of the ends thereof by means of the toe lugs or tie bars 18 which serve as key supports, as later described. The head is also provided with the brake shoe engaging intermediate head lugs or spaced center lugs 20 disposed between the toe lugs and adapted to embrace the center lug 22 provided on the brake head engaging portion or back of the brake shoe 24, the brake shoe 24 being preferably provided with lugs 26 adapted to be embraced by the toe portions 16 and to be disposed outwardly of the toe lugs 18.

Securing means between the brake shoe and brake head is provided in the form of a key 28 which, in the construction shown in Figure 1, is of slightly tapering width but of uniform thickness, being made of spring steel properly tempered, and insertable, without effort, into the head and shoe openings provided by the toe lugs and provided in the center lugs, for approximately two-thirds of its length, the key then being adapted to be driven into position whereby a truss securing means is provided effective for substantially the entire length of the head. The key is substantially of arcuate shape throughout its length, being shaped so that upon being driven home the key deflects, without taking a permanent set, between the toe lugs 18 on the head and the back of the center lug 22 on the brake shoe, the force developed thus holding the shoe tightly in position and preventing wear between the head and key.

Different forms of keys are provided, as shown at 30, 32 and 34, each key being bent backward to clear the end stops or lugs 26 of the shoe at each end thereof such as shown at 36 and 38, the bent portion at 36 forming a deflected end or approach portion offset from the central portion to facilitate application of the key.

In the construction shown in Figures 5 and 6, a locking ledge 40 is provided adjacent an end of said key adapted to engage the bottom or outside edge of the lower toe lug to prevent the possibility of the key working upward and loosening in service.

In the construction shown in Figures 7 and 8 spaced lugs 42 are provided for the same purpose.

Although the keys shown in Figures 5 to 8 inclusive, are shown made from a bar of the same width throughout, it will of course be understood that said interlocking means can be applied to the tapered form of key illustrated in Figure 2.

In the construction illustrated in Figure 1 the key is made of constant thickness throughout, whereas in the construction shown in Figure 3 a key is shown which is substantially of uniform thickness from the bottom up to the line indicated as $a$—$a$ which is approximately midway between the ends thereof.

The key is then made to gradually increase in thickness to a point adjacent the top or head end 44. This type key is adapted for use with a brake shoe arrangement provided with the toe lugs or with the standard A. R. A. type in which the toe lugs are omitted, and when used with this latter head functions in the same manner as the present A. R. A. key in that its tapered thickness acts as a wedge and locks the head to the shoe when it is driven into assembly position. Furthermore, the construction of the key of Figure 3 facilitates the assembling of the brake head and shoe. As clearly shown in Figure 9 of the drawings, the key, because of its uniform thickness at its end, may be readily inserted by hand into a position whereby its lower end engages the lower toe lug to hold the brake head and shoe together. It will be noticed that at this time the tapered portion of the key does not engage the center lug 22 and does not effect a wedging of the shoe to the brake head which would prevent insertion of the key by hand to initially hold the shoe and brake head together. After the key has been inserted by hand into the position shown in Figure 9, the key may be driven into its fully operative position shown in Figure 10, during which time the tapered portion above line $a$—$a$ acts as a wedge to draw the shoe into firm engagement with the lugs 20 of the brake head.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a brake head and shoe assembly, the combination of a brake head having toe lugs adjacent the ends thereof, a brake shoe carried by said head and having a center lug, and a resilient key engaging the toe and center lugs only of said brake head and shoe and flexed therebetween for securing said shoe to said head.

2. In a brake head and shoe assembly, the combination of a brake head having spaced toe lugs adjacent the upper and lower ends thereof, intermediate brake head lugs, a brake shoe engaging said intermediate lugs and having locking means disposed adjacent thereto, and a key for securing said brake shoe to said head, said key engaging said toe lugs and locking means only of said brake head and shoe and spaced from said intermediate lugs.

3. In a brake head and shoe assembly, the combination of a brake head having spaced toe lugs adjacent the upper and lower ends thereof, intermediate brake head lugs, a brakeshoe engaging said intermediate lugs, said shoe having a center lug disposed between said intermediate lugs, and a key for securing said brake shoe to said head, said key engaging said toe and center lugs only and spaced from said intermediate lugs.

4. In a brake head and shoe assembly, the combination of a brake head having spaced toe lugs adjacent the upper and lower ends thereof, intermediate brake head lugs, a brake shoe engaging said intermediate lugs and spaced from said toe lugs, said shoe having a center lug disposed between said intermediate lugs, and a key for securing said brake shoe to said head, said key engaging said toe and center lugs only and spaced from said intermediate lugs.

5. In a brake head and shoe assembly, the combination of a brake head having toe lugs, a brake shoe carried by said head and having a center lug, and a resilient key engaging said toe and center lugs only for securing said shoe to said head, said key being substantially arcuate in side elevation and provided with an offset approach portion.

6. In a brake head and shoe assembly, the combination of a brake head having toe lugs, a brake shoe carried by said head and having a center lug, and a resilient tapered key engaging said toe and center lugs only for securing said shoe to said head, said key being substantially arcuate in side elevation and provided with an offset approach portion.

7. In a brake head and shoe assembly, the combination of a brake head having toe lugs, a brake shoe carried by said head and having a center lug, and a resilient key engaging said toe and center lugs only for securing said shoe to said head, said key being substantially arcuate in side elevation and provided with an offset approach portion, the thickness of said key being substantially constant.

8. In a brake head and shoe assembly, the combination of a brake head having toe lugs, a brake shoe carried by said head and having a center lug, and a resilient key engaging said toe and center lugs only for securing said shoe to said head, said key being substantially arcuate in side elevation and provided with an offset approach portion, the thickness of said key being substantially constant for substantially half its length then of increasing thickness to the head thereof.

9. A spring steel key for securing means between a brake head and brake shoe, said key having an offset approach portion, the end portion formed with said offset portion being of substantially constant thickness, the other end portion being tapered.

10. A spring steel key for securing means between a brake head and brake shoe, said key having an offset approach portion and being of substantially constant thickness for substantially half the length thereof adjacent thereto and the remaining portion of the key increasing in thickness to the head thereof.

11. A spring steel key for securing means between a brake head and brake shoe, said key having an offset approach portion and being of substantially constant thickness for substantially half the length thereof adjacent thereto and the remaining portion of the key increasing in thickness to the head thereof, said key having a locking ledge adjacent said approach portion.

12. A spring steel key for securing means between a brake head and brake shoe, said key having an offset approach portion and being of substantially constant thickness for substantially half the length thereof adjacent thereto and the remaining portion of the key increasing in thickness to the head thereof, said key having spaced locking lugs adjacent said approach portion.

13. A spring steel key for securing means between a brake head and brake shoe, said key having an offset approach portion and being of substantially constant thickness for a portion of its length adjacent thereto.

14. A spring steel key for securing means between a brake head and brake shoe, said key having an offset approach portion and being of substantially constant thickness for substantially half the length thereof adjacent thereto and then increasing in thickness to the head thereof.

15. In a brake head and shoe assembly, the combination of a brake head, a brake shoe and a connection between said head and shoe, said connection forming a truss between said head and shoe having points of support on and adjacent the ends of said head and being unsupported therebetween.

16. In a brake head and shoe assembly, the combination of a brake head having toe lugs adjacent the ends thereof, a brake shoe carried by said head and having a center lug, and a connection between said head and shoe having cooperative relation with said center and toe lugs only and forming a truss therewith.

17. In a brake mechanism, the combination of a brake head having spaced key supports, a brake shoe engaging said head, said shoe having a wheel engaging surface and locking means, and a resilient key disposed to conform substantially to the disposition of said surface and having engagement with said supports adjacent its ends, said key being unsupported between said supports and engaging with said supports and said locking means only whereby the same acts as a truss to hold said shoe in association with said head.

18. In a brake mechanism, the combination of a brake head, a resilient key having points of support adjacent the ends of said head, said key being unsupported between said points of support only and having its central part offset in relation to said points of support, and a brake shoe engaging said head and having locking means engaging said offset part to flex said part toward a line between said points of support whereby said shoe is held in association with said head.

19. In a brake mechanism, the combination of a brake head having toe lugs, a brake shoe having bearing with said head intermediate said lugs and having locking means, and a resilient key engaging said toe lugs and said locking means only and flexed therebetween for securing said shoe to said head, said shoe being initially spaced from said toe lugs but bearing therewith after wear between said head and shoe.

20. A spring steel key for securing means between a brake head and brake shoe, said key having an approach portion and being of substantially constant thickness for a portion of its length adjacent thereto and then increasing in thickness for the remaining portion to the head thereof.

21. A spring key for securing means between a brake head and brake shoe having an approach portion, said key for a portion of its length adjacent thereto being of substantially uniform thickness and the key at the other end thereof increasing in thickness from said portion of uniform thickness.

ARMAND H. PEYCKE.